United States Patent [19]
Crane et al.

[11] Patent Number: 5,774,304
[45] Date of Patent: Jun. 30, 1998

[54] DISC HEAD SLIDER HAVING CENTER RAIL WITH ASYMMETRIC EDGE STEPS

[75] Inventors: Peter Crane, Richfield; Robert Edward Chapin, Burnsville, both of Minn.

[73] Assignee: Seagate Technology, Inc., Scotts Valley, Calif.

[21] Appl. No.: 642,755

[22] Filed: May 3, 1996

Related U.S. Application Data

[60] Provisional application No. 60/009,787 Jan. 16, 1996.

[51] Int. Cl.$^6$ .................................................. G11B 21/21
[52] U.S. Cl. .......................................................... 360/103
[58] Field of Search ............................................. 360/103

[56] References Cited

U.S. PATENT DOCUMENTS

| | | | |
|---|---|---|---|
| 4,636,894 | 1/1987 | Mo | 360/103 |
| 4,646,180 | 2/1987 | Ohtsubo | 360/103 |
| 4,673,996 | 6/1987 | White | 360/103 |
| 4,870,519 | 9/1989 | White | 360/103 |
| 4,893,204 | 1/1990 | Yamada et al. | 360/103 |
| 4,894,740 | 1/1990 | Chhabra et al. | 360/103 |
| 5,062,017 | 10/1991 | Strom et al. | 360/103 |
| 5,200,868 | 4/1993 | Chapin et al. | 360/103 |
| 5,267,104 | 11/1993 | Albrecht et al. | 360/103 |
| 5,267,109 | 11/1993 | Chapin et al. | 360/103 |
| 5,299,079 | 3/1994 | Kuroda | 360/103 |
| 5,359,480 | 10/1994 | Nepela et al. | 360/103 |
| 5,404,256 | 4/1995 | White | 360/103 |
| 5,424,888 | 6/1995 | Hendriks et al. | 360/103 |
| 5,430,591 | 7/1995 | Takeuchi et al. | 360/103 |
| 5,473,485 | 12/1995 | Leung et al. | 360/103 |
| 5,488,524 | 1/1996 | Cunningham | 360/103 |
| 5,508,862 | 4/1996 | Lazzari et al. | 360/103 |
| 5,513,056 | 4/1996 | Kawasaki et al. | 360/103 |
| 5,625,513 | 4/1997 | Utsunomiya et al. | 360/103 |

FOREIGN PATENT DOCUMENTS

| | | | |
|---|---|---|---|
| 0 146 217 | 6/1985 | European Pat. Off. . | |
| 2 629 247 | 9/1989 | France . | |
| 54-151425 | 11/1979 | Japan | 360/103 |
| 60-101781 | 6/1985 | Japan . | |
| 60-242548 | 12/1985 | Japan . | |
| 62-279515 | 12/1987 | Japan . | |
| 1-211383 | 8/1989 | Japan . | |
| 1-245480 | 9/1989 | Japan . | |
| 1-319188 | 12/1989 | Japan . | |
| 2-49281 | 2/1990 | Japan . | |
| 2-53256 | 2/1990 | Japan . | |
| 5-028685 | 2/1993 | Japan | 360/103 |
| 6-275038 | 9/1994 | Japan | 360/103 |
| WO91/06397 | 5/1991 | WIPO | 360/103 |

OTHER PUBLICATIONS

Photograph of SILMAG slider (Sep. 23, 1993).
Product Sheet of SILMAG slider used in Samsung PLS–3108A disc drive (Oct. 25, 1995).

*Primary Examiner*—Craig A. Renner
*Attorney, Agent, or Firm*—Westman, Champlin & Kelly, P.A.

[57] ABSTRACT

A disc head slider for communicating with a rotating disc includes a slider body with leading and trailing slider edges, inside and outside slider edges relative to the disc, and a center line which extends from the leading slider edge to the trailing slider edge. A center rail is positioned substantially along the center line and includes inside and outside rail edges, a bearing surface and an edge step surface which is raised from the slider body and recessed from the bearing surface. The edge step surface extends along at least one of the inside and outside rail edges and has a greater area along the inside rail edge than the outside rail edge.

18 Claims, 8 Drawing Sheets

DISC HEAD SLIDER HAVING CENTER RAIL WITH ASYMMETRIC EDGE STEPS

This application claims the benefit of U.S. Provisional Application No., 60/009,787 filed Jan. 16, 1996.

BACKGROUND OF THE INVENTION

The present invention relates to a disc drive data storage device and, more particularly, to a disc drive having a slider with an asymmetric center rail.

Disc drives of the "Winchester" type are well known in the industry. Such drives use rigid discs coated with a magnetizable medium for storage of digital information in a plurality of circular, concentric data tracks. The discs are mounted on a spindle motor which causes the discs to spin and the surfaces of the discs to pass under respective head gimbal assemblies (HGAs). Head gimbal assemblies carry transducers which write information to and read information from the disc surface. An actuator mechanism moves the head gimbal assemblies from track to track across the surfaces of the discs under control of electronic circuitry. The actuator mechanism includes a track accessing arm and a load beam for each head gimbal assembly. The load beam provides a preload force which urges the head gimbal assembly toward the disc surface.

The head gimbal assembly includes a hydrodynamic (e.g. air) bearing slider and a gimbal. The gimbal is positioned between the slider and the load beam to provide a resilient connection that allows the slider to pitch and roll while following the topography of the disc. A conventional catamaran slider includes a pair of raised side rails which face the disc surface and form air bearing surfaces. As the disc rotates, the disc drags air under the slider along the air bearing surfaces in a direction approximately parallel to the tangential velocity of the disc. As the air passes beneath the side rails, skin friction on the air bearing surfaces causes the air pressure between the disc and the air bearing surfaces to increase which creates a hydrodynamic lifting force that causes the slider to lift and fly above the disc surface. The preload force supplied by the load beam counteracts the hydrodynamic lifting force. The preload force and the hydrodynamic lifting force reach an equilibrium based upon the hydrodynamic properties of the slider and the speed of rotation of the disc.

Flying height is viewed as one of the most critical parameters of contact and non-contact recording. As the average flying height of the slider decreases, the transducer achieves greater resolution between the individual data bit locations on the disc. Therefore, it is desirable to have the transducers fly as close to the disc as possible. Flying height is preferably uniform regardless of variable flying conditions, such as tangential velocity variation from inside to outside tracks, lateral slider movement during seek operations and air bearing skew angles.

A catamaran slider develops four pressure peaks at the four corners of the slider. The pressure peaks at the leading edge are typically produced by a lapped leading edge taper and result in high pitch stiffness. With high pitch stiffness, the slider resists pitching forward and "crashing" into the disc surface. The pressure peaks at the trailing edge are produced by a low clearance between the side rails and the disc surface. Such a design generates a very stiff air bearing in the pitch and roll directions, and a tight flying height distribution is achieved.

White U.S. Pat. No. 4,673,996 discloses a catamaran slider having side rails with transverse pressurization contours (TPCs) which reduce fly height and roll angle sensitivity to skew angle and access velocity. The TPCs can have symmetric or asymmetric heights and widths on each edge of the side rails. A transducer is positioned at the trailing edge of one of the side rails.

In a typical fabrication process, several thousand heads are fabricated on a ceramic wafer and encapsulated with Alumina. The wafer is then sliced and diced into individual sliders with airbearing surfaces formed on the sliced areas. The airbearing surfaces are formed by lapping, ion milling or etching processes, and by shallow saw cuts or grinding passes. Lapping smoothes out the roughness left by the slicing saw. The lapped surface forms a reference level from which other processes form reliefs or pockets of various depths which define the airbearing surfaces. Shallow saw cuts and grinding passes are on the order of 30–60 microns deep. Step milling or etching is typically 0.5–2.0 microns deep. Cavity milling or etching is typically 2.0–6.5 microns deep and always deeper than step milling.

The lapped leading edge taper requires complex lapping equipment which is capable of tilting the workpiece and maintaining precise control over the angle of tilt and the duration of taper lapping. The duration of taper lapping determines the finished leading tapered length. Variation in the leading taper length is a significant factor contributing to flying height variation. This flying height variation in turn contributes to variation in the recording signal. The disc file capacity must be derated to absorb the variation in recording signal. Reducing the flying height variation allows higher capacity magnetic recording.

SUMMARY OF THE INVENTION

The disc head slider of the present invention includes a slider body with leading and trailing slider edges, inside and outside slider edges relative to the disc, and a center line which extends from the leading slider edge to the trailing slider edge. A center rail is positioned substantially along the center line and includes inside and outside rail edges, a bearing surface and an edge step surface which is raised from the slider body and recessed from the bearing surface. The edge step surface extends along at least one of the inside and outside rail edges and has a greater area along the inside rail edge than the outside rail edge.

In one embodiment, the slider further includes an outside rail and an inside rail which are disposed about the center rail. The inside and outside rails also have inside and outside rail edges with edges step surfaces. The edge step surface areas are distributed between the inside, outside and center rails such that area of the center rail edge step surface is greater than the area of the inside rail edge step surface and greater than the area of the outside rail edge step surface.

In another embodiment, each rail further includes a leading step surface and a leading face which extends between the leading step surface and the bearing surface. The leading faces of the rails are substantially parallel to one another and form an acute angle with the leading slider edge.

The slider provides relatively efficient pressurization of the bearing surfaces at an inner diameter of the disc and relatively inefficient pressurization of the bearing surfaces at an outer diameter of the disc such that a close point flying height of the slider is substantially the same at the inner and outer diameters.

DETAILED DESCRIPTION OF THE PREFERRED EMBODIMENTS

Figure 1:
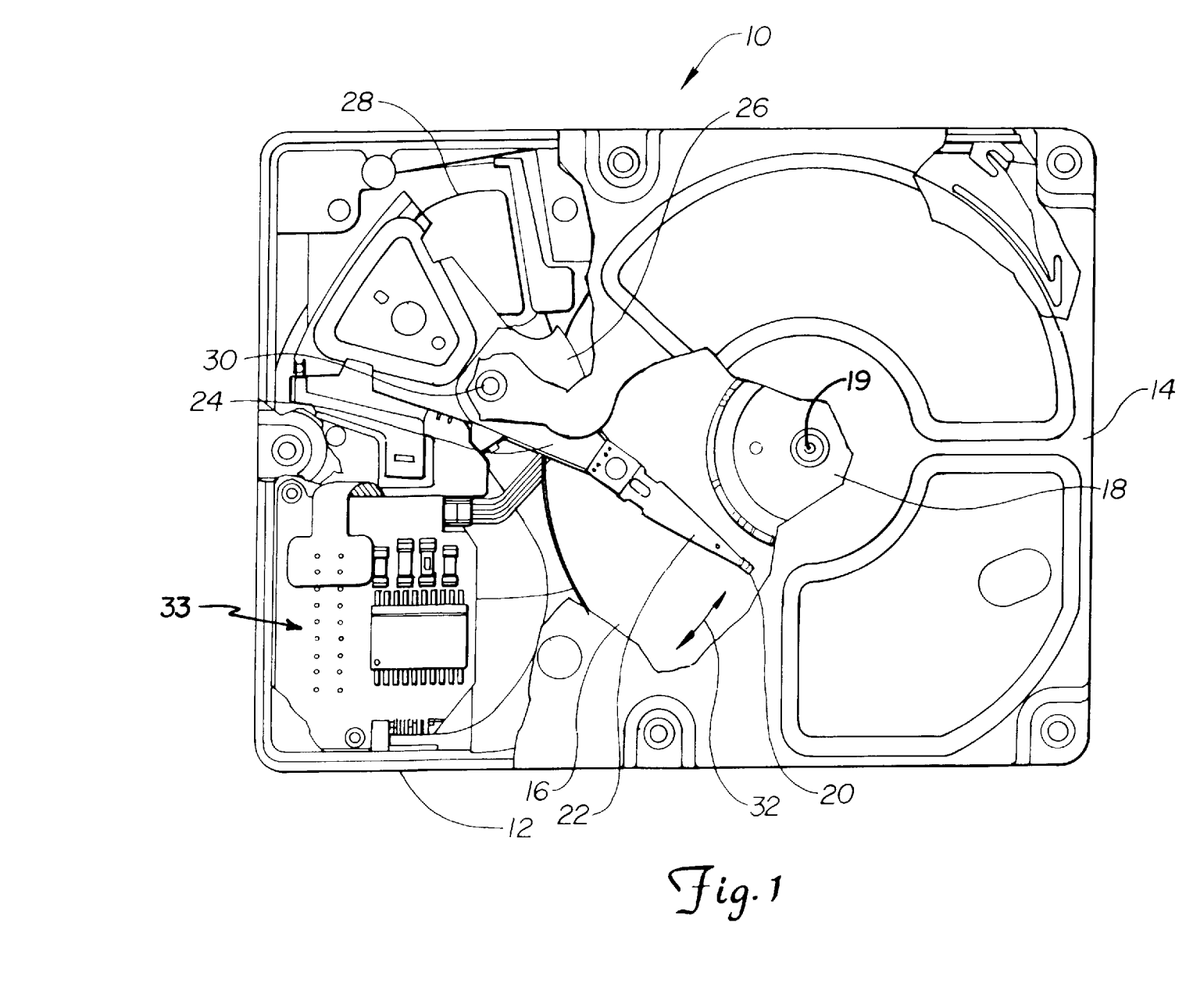
FIG. 1 is a plan view of a typical disc drive in which the present invention is useful.

FIG. 1 is a plan view of a typical disc drive 10 in which the present invention is useful. Disc drive 10 includes a housing with a base 12 and a top cover 14 (portions of top cover 12 are removed for clarity). Base 12 is combined with top cover 14 to form a sealed environment to protect internal components from contamination from outside the sealed environment. Disc drive 10 further includes a disc pack 16 which is mounted on a spindle motor (not shown) by a disc clamp 18. Disc pack 16 includes a plurality of individual discs which are mounted for co-rotation about a central axis 19.

Each disc surface has an associated head gimbal assembly (HGA) 20 which is mounted to disc drive 10 for communicating with the disc surface. In the example shown in FIG. 1, HGA's 20 are supported by load beam flexures 22 which are in turn attached to track accessing arms 24 of an actuator 26. The actuator shown in FIG. 1 is of the type known as a rotary moving coil actuator and includes a voice coil motor (VCM), shown generally at 28. Voice coil motor 28 rotates actuator 26 with its attached heads 20 about a pivot shaft 30 to position heads 20 over a desired data track along an arcuate path 32 under the control of electronic circuitry 33. While a rotary actuator is shown in FIG. 1, the present invention is also useful in disc drives having other types of actuators, such as linear actuators.

Figure 2:
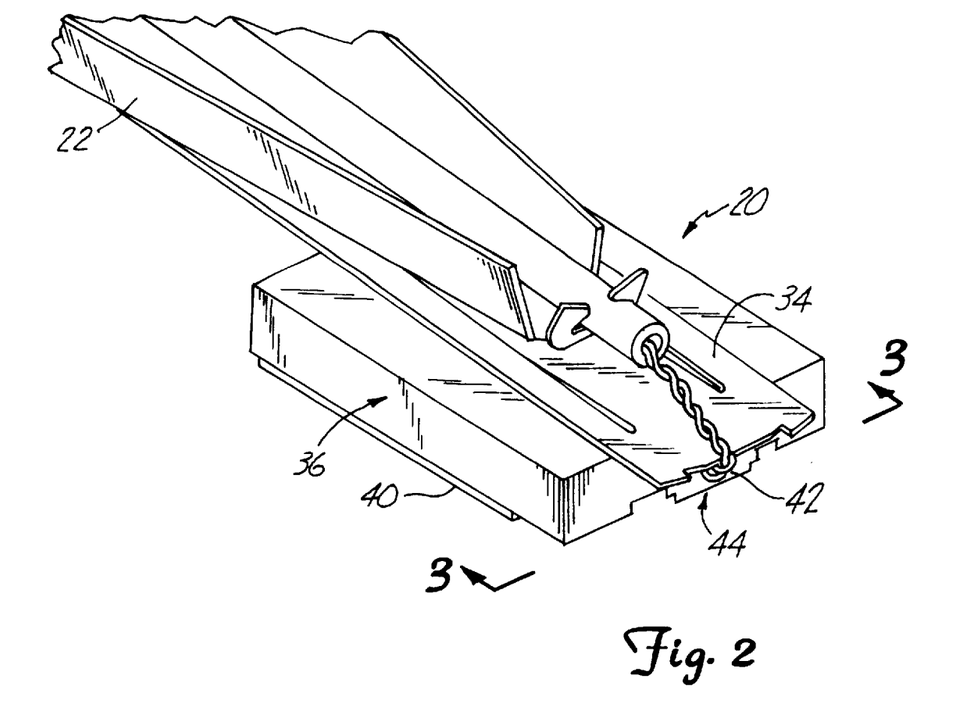
FIG. 2 is a perspective view of a head gimbal assembly supported by a load beam flexure in accordance with the present invention.
Figure 3:
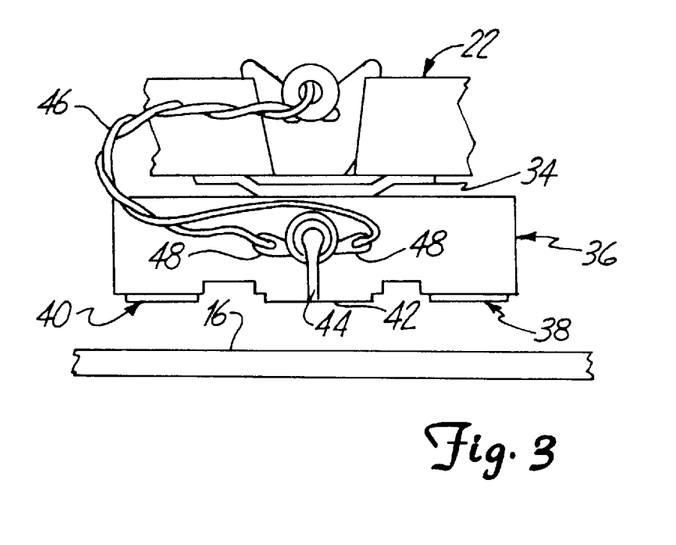
FIG. 3 is an end view of the head gimbal assembly taken along line 3—3 of FIG. 2.

FIGS. 2 and 3 show head gimbal assembly 20 in greater detail. FIG. 2 is a perspective view of head gimbal assembly 20 supported by load beam flexure 22. FIG. 3 is an end view of head gimbal assembly 20 taken along line 3—3 of FIG. 2. Load beam 22 provides a preload force which urges head gimbal assembly 20 toward the disc surface. Assembly 20 includes a gimbal 34 and a slider 36. Gimbal 34 is positioned between slider 36 and load beam 22 to provide a resilient connection that allows the slider to follow the topography of the disc. Slider 36 is connected to gimbal 34 in a known manner, such as with an adhesive. Gimbal 34 includes a dimple (not shown) that is in point contact with slider 36. The dimple provides pivot about which slider 30 can pitch and roll while following the topography of disc 16.

Slider 36 includes side rails 38 and 40, center rail 42 and transducer 44. Side rail 38 is referred to as an "inside" rail since it is positioned closest to an inner diameter of disc 16 compared to rails 40 and 42. Side rail 40 is referred to as an "outside" rail since it is positioned closest to an outer diameter of disc 16. Center rail 42 is positioned between inside rail 38 and outside rail 40 and preferably along a center line of slider 36.

Transducer 44 is mounted to a trailing end of center rail 42 and thus has a spacing over disc 16 that is relatively insensitive to slider roll about its center line. Transducer 44 communicates with individual bit positions on the surface of disc 16 as they pass beneath slider 36. Transducer 44 is electrically coupled to leads 46 at bonding pads 48. The central transducer position minimizes the length of the conductor between head 44 and bonding pads 48 which reduces head resistance and improves read and write performance. Transducer 44 can include a thin film or magnetoresistive magnetic head, for example. The number of conductors and bonding pads depends on the number of conductors required for the particular head that is carried by slider 36.

Figure 4:
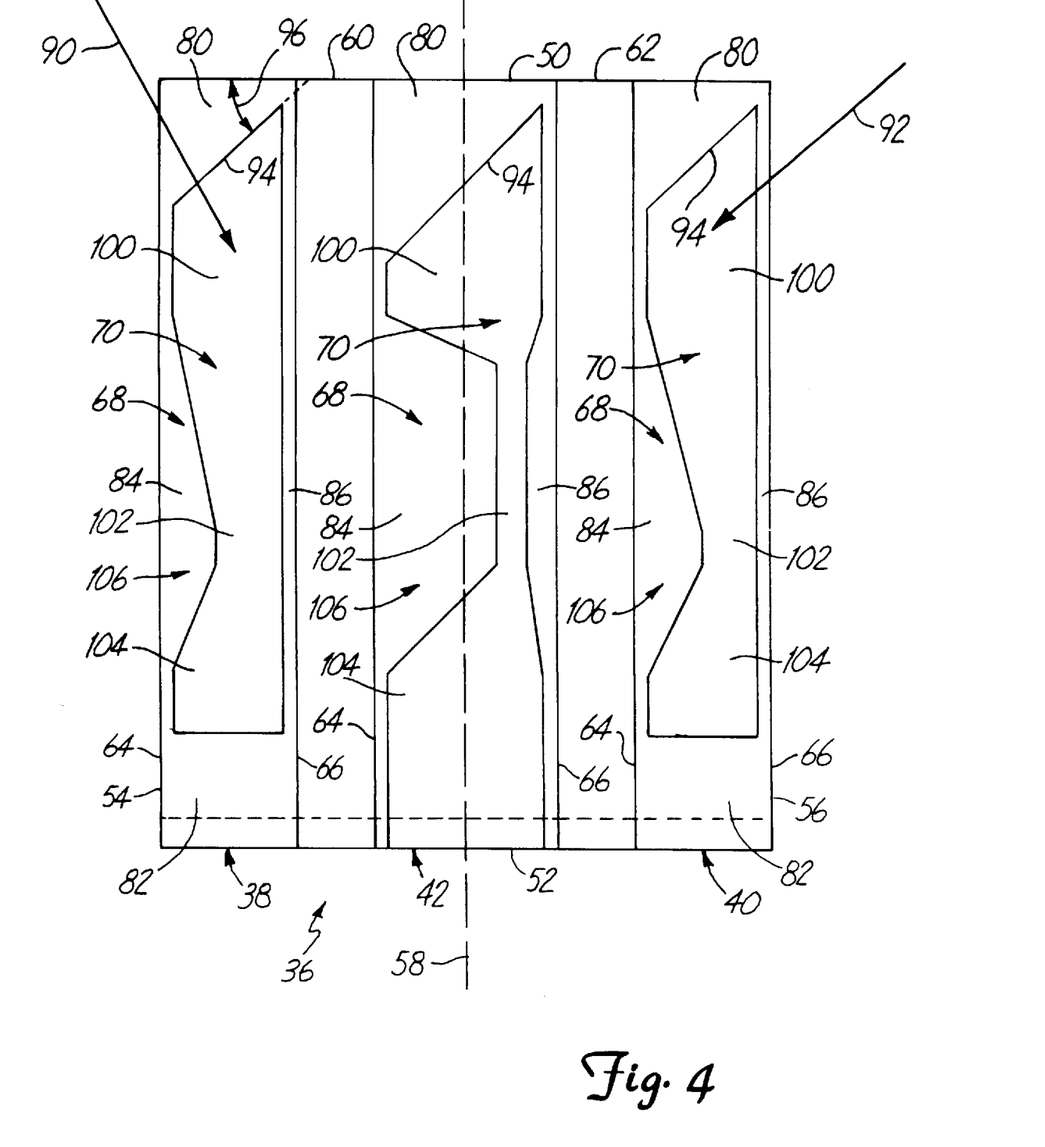
FIG. 4 is a bottom plan view of a slider in accordance with the present invention.

FIG. 4 is a bottom plan view of slider 36. Slider 36 includes leading edge 50, trailing edge 52, inside edge 54, outside edge 56, longitudinal center line 58 and bleed slots 60 and 62. Each rail has an inside edge 64, an outside edge 66, a recessed step surface 68 and a raised bearing surface 70. Recessed step surfaces 68 are preferably substantially parallel to raised bearing surfaces 70.

In one preferred embodiment, bleed slots 60 and 62 are approximately 5 mils wide and between 15–50 microns deep, as measured from bearing surfaces 70. Bleed slots 60 and 62 extend from leading edge 50 to trailing edge 52 and develop substantially ambient pressure during operation. Bleed slots 60 and 62 are formed by shallow saw cuts or grinding passes, for example. Step surfaces 68 are preferably recessed from bearing surfaces 70 approximately 0.1 to 2.0 microns by step milling or etching, for example.

Bearing surface 70 of center rail 42 extends to trailing edge 52 to provide a surface on which to mount transducer 44 (shown in FIGS. 2 and 3) along the trailing edge, at center line 58. As slider 36 flies above disc 16, slider 36 has a positive pitch, with leading edge 50 having a higher flying height than trailing edge 52. The central mounting position of transducer 44 ensures that the transducer is positioned near the close point clearance of the slider over various roll angles about center line 58.

Rotary actuator arms cause the geometric orientation between the disc rotation tangent and the slider's center line to change as the arm moves the slider between the inner diameter and the outer diameter of the disc. This is known as skew or skew angle. Large skew angles make flying height control more difficult. When a typical slider flies at skew with respect to the direction of air flow, unequal pressure distribution develops between the rails. This causes the slider to roll, resulting in one rail being closer to the disc surface than the other rail. As a result, the probability of contact with the disc surface at slider corner increases. Bearing surfaces 70 of side rails 38 and 40 terminate prior to trailing edge 52 to allow slider 36 to roll about center line 58 without making contact with the disc surface at the slider corners.

Recessed step surfaces 68 reduce fly height variation and slider roll due to changes in skew angle and disc tangential velocity from the inner to the outer diameter of disc 16. Recessed step surfaces 68 each include a leading step surface 80, a trailing step surface 82, an inside step surface 84 and an outside step surface 86. Recessed step surfaces 68 are asymmetric with respect to the inside and outside edges 64 and 66 of each rail. Inside step surface 84 has a larger surface area than outside step surface 86. Outside step surface 86 is very narrow, such as 1.0 mil wide, and is provided to maintain width control for bearing surfaces 70 with variations in the width of bleed slots 60 and 62 or in the slicing of individual sliders at the side edges.

When slider 36 is at the inner diameter of disc 16, air flows from inside rail 38 toward outside rail 40, generally along line 90. The inside step surfaces 84 are positioned generally upstream from each bearing surface 70. As the air travels across the shallow recess of inside step surfaces 84, the air becomes prepressurized before pressurizing the bearing surfaces 70. This is known as the "step bearing effect". The inside step surfaces therefore increase pressurization at the inner diameter.

When slider 36 is at the outer diameter of disc 16, air flows from outside rail 40 toward inside rail 38, generally along line 92. Each bearing surface 70 is therefore pressurized by ambient air rather than prepressurized air, resulting in relatively inefficient pressurization at the outer diameter as compared to the inner diameter. In addition, the air decompresses as it travels from each bearing surface 70 to the corresponding inside step surface 84, which creates a small, subambient pressure pocket along the inside edge of each rail. Inefficient pressurization at the outer diameter in combination with efficient pressurization at the inner diameter counteracts the tendency of the slider to fly higher at the outer diameter than at the inner diameter, resulting in a more flat fly height profile across the disc surface.

A typical slider has a taper at the leading edge of each rail to provide for fast takeoff performance and high pitch stiffness. However, leading tapers require complex lapping equipment and cause fly height variations due to variations in the taper length. Leading step surfaces 80 replace the leading edge tapers. Leading step surfaces 80 provide adequate takeoff performance and pitch stiffness while eliminating the requirement for complex lapping equipment and resulting fly height variations. It has been found that replacing the lapped leading taper by a leading step surface reduces fly height tolerance by approximately 7 percent at the inner diameter of the disc and by approximately 13 percent at the outer diameter of the disc. No adverse wear effects were found.

The transition between each leading step surface 80 and the corresponding bearing surface 70 defines a leading face 94 which forms an acute angle 96 with leading edge 50. As the disc drags debris particles beneath slider 36 leading faces 94 direct the debris off the side of the rails, rather than allowing the debris to build up at leading edge 50. Leading faces 94 are substantially parallel to one another in FIG. 4, but are non-parallel in alternative embodiments.

Leading faces 94 preferably open toward inside edge 54, as opposed to outside edge 56. As a result, leading faces 94 efficiently pressurize bearing surfaces 70 at the inner diameter of disc 16, where the disc sweeps air from inside rail 38 toward outside rail 40, as shown by line 90. At the outer diameter of disc 16, leading faces 94 have inefficient pressurization since the disc sweeps air from outside rail 40 toward inside rail 38, as shown by arrow 92. The angled leading faces 94 therefore further improve the fly height profile between the inner and outer diameters of the disc. The angled leading faces 94 also reduce a "hump" in the fly height profile at a middle diameter of the disc. This allows higher density recording on the middle data tracks and increases the disc file storage capacity.

Bearing surfaces 70 include a leading portion 100, a waist portion 102 and a trailing portion 104. Bearing surfaces 70 narrow at waist portions 102 to form waist step surfaces 106, which form part of the inside step surfaces 84. Waist step surfaces 106 are preferably positioned along the inside edges 64 of rails 38, 40 and 42. In one embodiment, slider 36 is approximately 40 mils wide and 50 mils long. Leading portion 100 and trailing portion 104 of side rails 38 and 40 have a maximum width of 7.0 mils. Waist portion 102 of side rails 38 and 40 has a minimum width of 4.0 mils. Leading portion 100 and trailing portion 104 of center rail 42 have a maximum width of 10.0 mils. Waist portion 102 of center rail 42 has a minimum width of 2.0 mils. Waist step surface 106 of center rail 42 has a width measured from bleed slot 60 of approximately 8.0 mils. Outside step surface 86 of center rail 42 has a width measured from bleed slot 62 at waist portion 102 of approximately 2.0 mils. Other dimensions can be used in alternative embodiments.

A design requirement for sliders is a high tolerance for carriage slams. Carriage slam tolerance is typically defined as the maximum acceleration the actuator can apply to the slider through the accessing arm without causing the slider to contact the disc surface. This high tolerance for carriage slams is obtained by distributing the areas of the asymmetric step surfaces 84 and 86 between side rails 38 and 40 and center rail 42 while still maintaining the benefits of the air bearing features.

Waist section 102 of center rail 42 is longer than the waist sections 102 of side rails 38 and 40. This provides waist step surface 106 of center rail 42 with a greater surface area than waist step surfaces 106 of rails 38 and 40. By distributing more of the surface area of waist step surfaces 106 on center rail 42 than on side rails 38 and 40, the benefits of the asymmetric step surfaces are maintained while maintaining rails 38 and 40 with relatively wide bearing surfaces through waist sections 102. The wide bearing surfaces of side rails 38 and 40 provide increased roll stiffness which improves carriage slam capacity. Center rail 42 therefore provides the flexibility to distribute the asymmetric edge steps while providing a preferred central mounting surface for the transducer.

Figure 5:
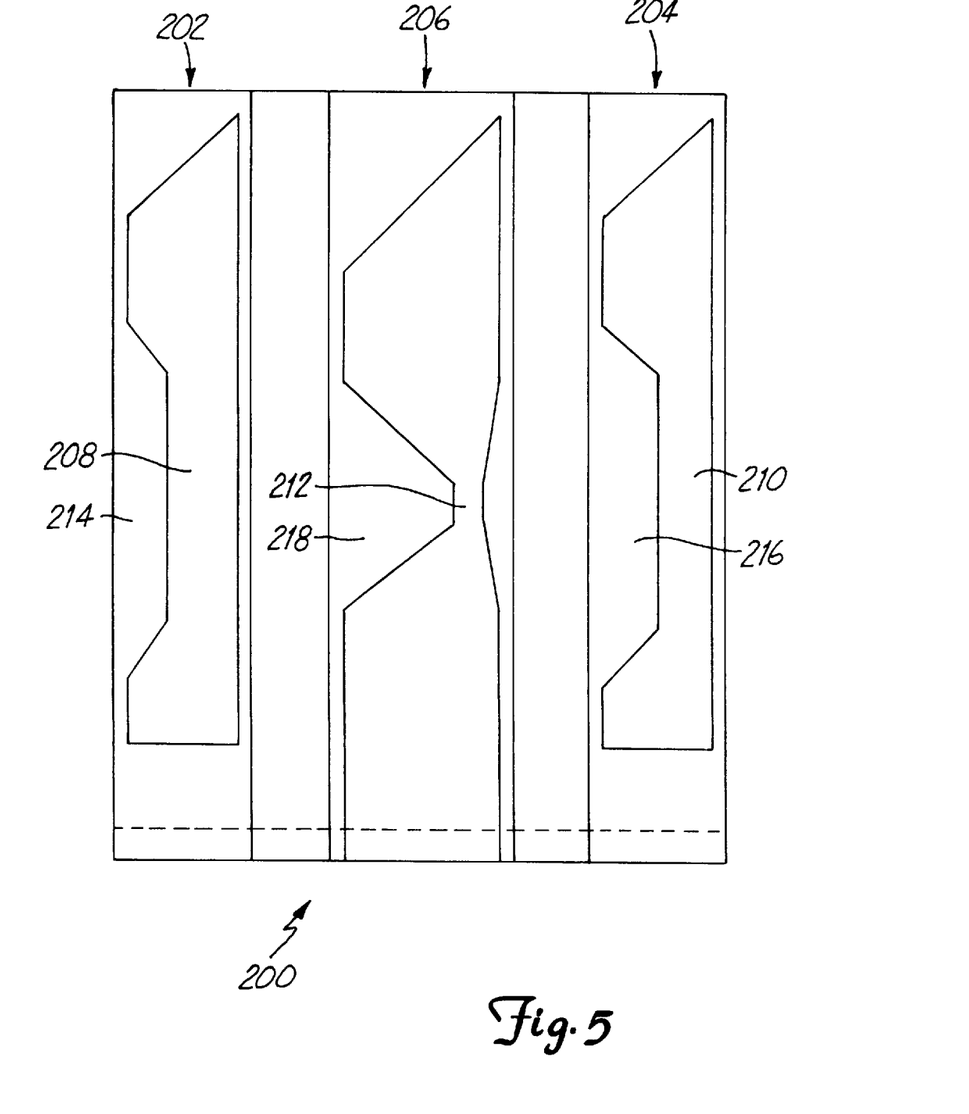
FIG. 5 is a bottom plan view of a slider in accordance with an alternative embodiment of the present invention.

The fly height profile and carriage slam capacity of slider 36 were compared with those of an alternative embodiment of the present invention, shown in FIG. 5. FIG. 5 is a bottom plan view of slider 200. Slider 200 has side rails 202 and 204 and center rail 206. Slider 200 is similar to slider 36 (shown in FIG. 4), but has relatively long waist portions 208 and 210 on side rails 202 and 204 and a relatively short waist portion 212 on center rail 206. Waist step surfaces 214 and 216 have a greater surface area than waist step surface 218. Since side rails 202 and 204 are narrower than side rails 38 and 40 of slider 36, side rails 202 and 204 are less stable and thus have a lower tolerance for carriage slams.

Figure 6A:
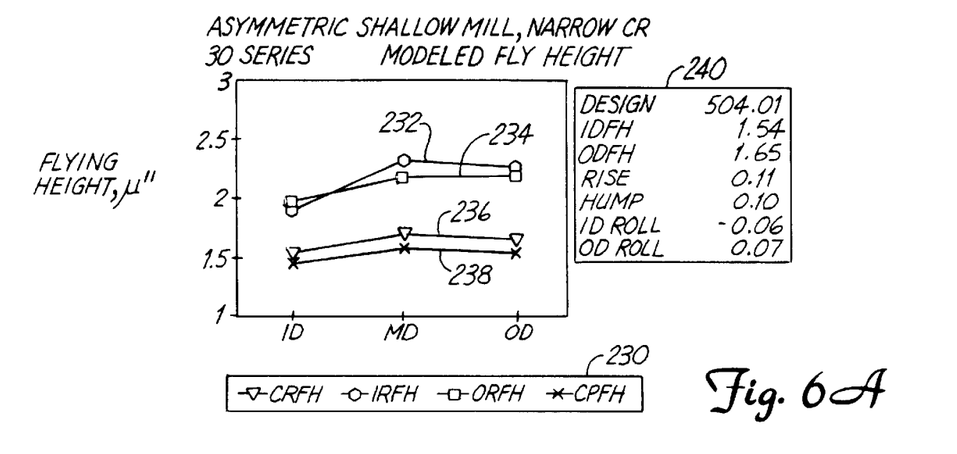
FIGS. 6A and 6B are graphs illustrating a modeled fly height profile for the sliders shown in FIGS. 4 and 5, respectively.
Figure 6B:
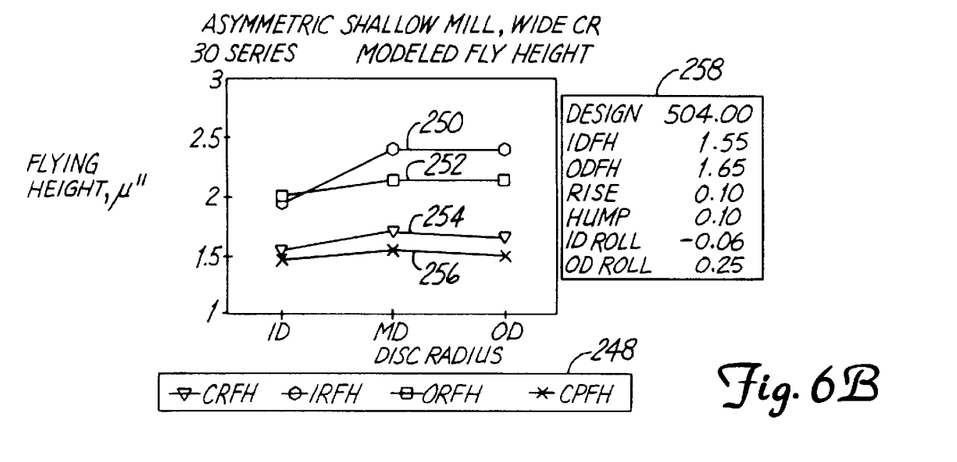

FIGS. 6A and 6B illustrate a modeled fly height profile for the sliders shown in FIGS. 4 and 5, respectively. Fly height was measured at the inner diameter (ID), the middle (MD) and the outer diameter (OD) of the disc at four different positions on the slider surface. Referring to FIG. 6A, legend 230 defines each line in the graph. Line 232 represents the fly height at the trailing edge of the inside rail (labeled "IRFH"), line 234 represents the fly height at the trailing edge of the outside rail (labeled "ORFH"), line 236 represents the fly height at the trailing edge of the center rail (labeled "CRFH") and line 238 represents the close point fly height (labeled "CPFH") which is at the trailing edge of the center rail. The center rail fly height is measured somewhat forward along the center rail of the close point fly height.

Slider 36 has a very flat fly height profile from the inner diameter to the outer diameter of the disc. An advantage of the leading step surfaces and the angled leading faces of the bearing surfaces is a very low "hump" in the fly height profile at the middle diameter of the disc. The hump is defined as:

$$MDFH-(IDFH+ODFH)/2$$

where MDFH is the middle diameter fly height, IDFH is the inner diameter fly height and ODFH is the outer diameter fly height.

Referring to FIG. 6B, legend 248 is similar to legend 230. Line 250 represents the fly height at the trailing edge of the inside rail, line 252 represents the fly height at the trailing edge of the outside rail, line 254 represents the fly height at the trailing edge of the center rail and line 256 represents the close point fly height. Legends 240 and 258 provide several fly height characteristics of sliders 36 and 200 in microinches. Sliders 36 and 200 both have a hump of 0.10 microinches. Such a low hump allows higher density recording on the middle data tracks and increases the disc file storage capacity. Slider 36 has a smaller roll at the outer diameter as compared to slider 200.

Figure 7A:
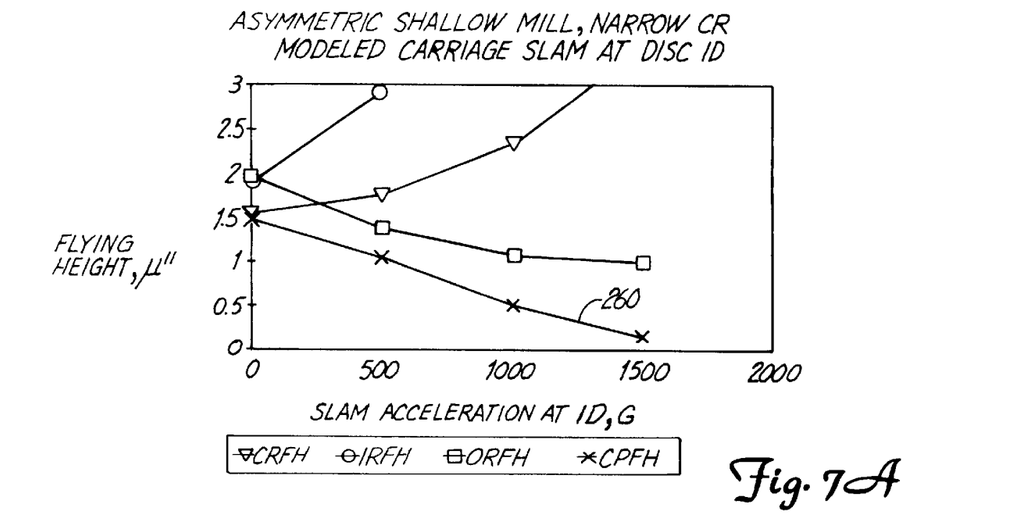
FIGS. 7A, 7B, 8A and 8B are graphs illustrating a modeled carriage slam capacity of the sliders shown in FIGS. 4 and 5.
Figure 7B:
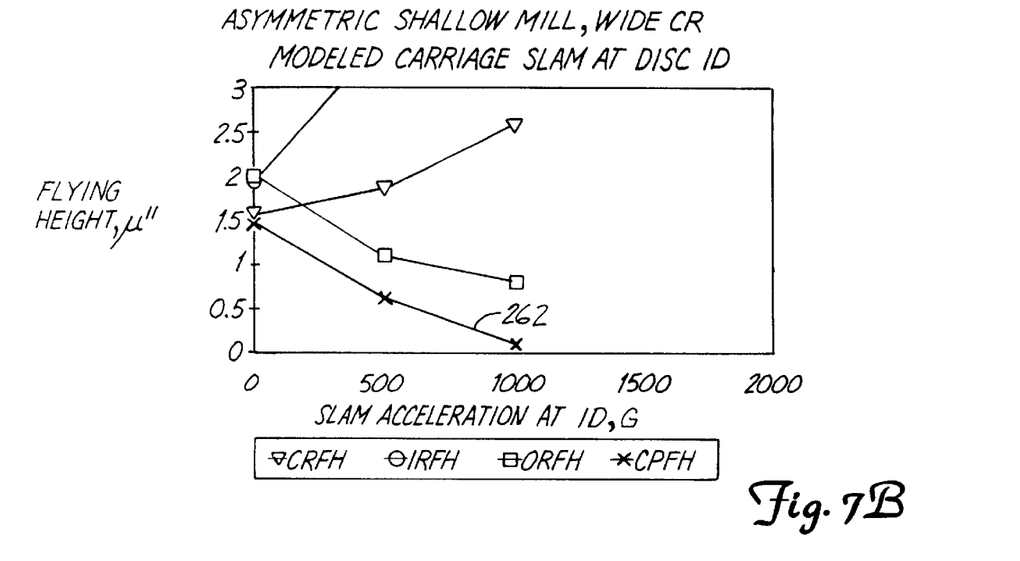

FIGS. 7A and 7B illustrate a modeled carriage slam capacity of sliders 36 and 200, respectively, at the inner diameter of the disc. Carriage slam capacity was modelled with the assumption that damage to the disc surface occurs when the fly height is at or below the average glide height of the slider along the surface roughness of the disc. The average glide height was defined as 0.7 microinches.

Referring to FIG. 7A, the close point fly height of slider 36 (shown by line 260) reaches 0.7 microinches at an acceleration of 825 g's. Referring to FIG. 7B, the close point fly height of slider 200 (shown by line 262) reaches 0.7 microinches at 458 g's. Slider 36 thus has a relatively high capacity for carriage slams at the inner diameter of the disc as compared to slider 200.

Figure 8A:
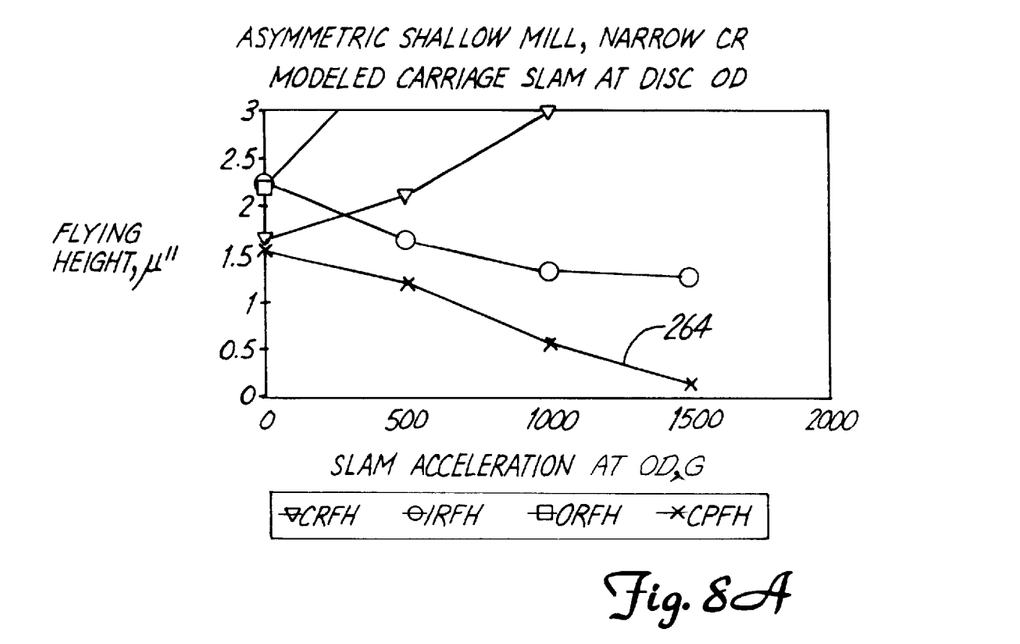
Figure 8B:
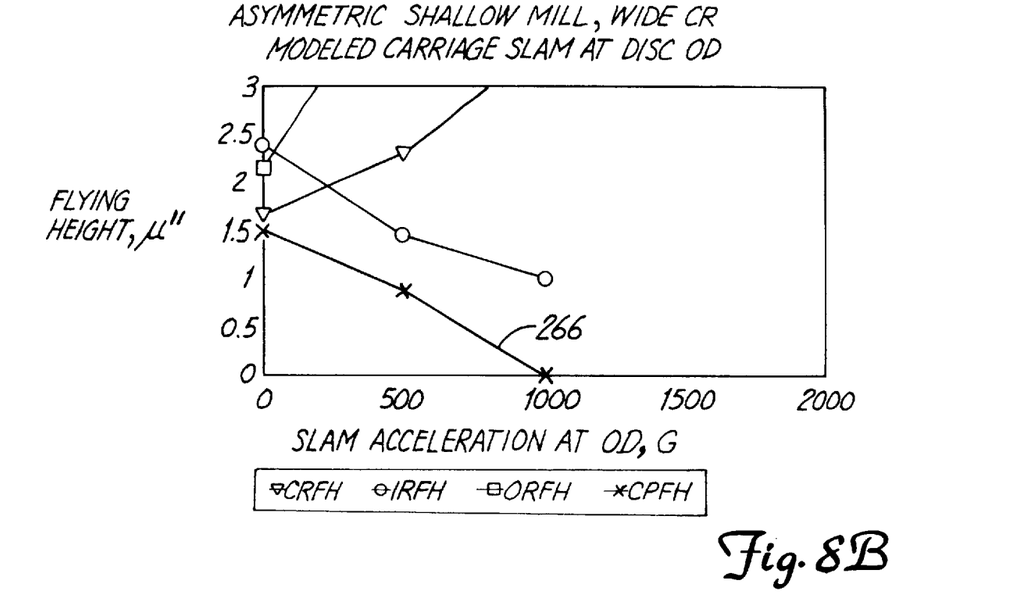

FIGS. 8A and 8B illustrate a modeled carriage slam capacity of sliders 36 and 200 at the outer diameter of the disc. Referring to FIG. 8A, the close point fly height of slider 36 reaches 0.7 microinches at 890 g's, as shown by line 264. Referring to FIG. 8B, the closed point fly height of slider 200 reaches 0.7 microinches at 611 g's, as shown by line 266. Slider 36 therefore also has improved carriage slam capacity at the outer diameter of the disc as compared to slider 200.

Figure 9:
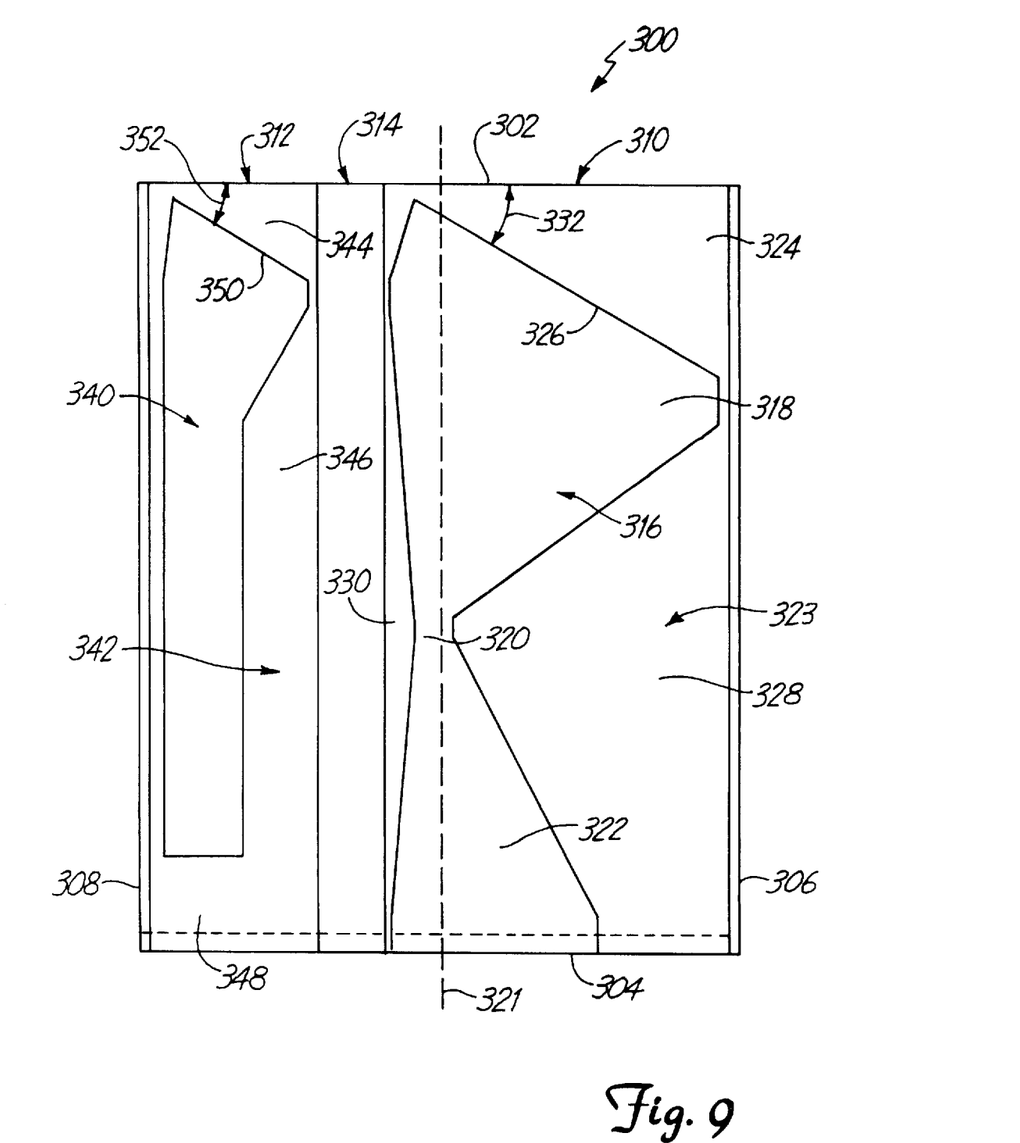
FIG. 9 is a bottom plan view of a slider in accordance with another alternative embodiment of the present invention.

FIG. 9 is a plan view of a slider according to another alternative embodiment of the present invention. Slider 300 includes leading edge 302, trailing edge 304, inside edge 306 and outside edge 308. The inside and outside edges are reversed from those shown in FIGS. 4 and 5, which simply reflects that the orientation of slider 300 corresponds to an opposite surface of the disc than the orientation of sliders 36 and 200.

Slider 300 includes rails 310 and 312 and a bleed slot 314. Bleed slot 314 extends from leading edge 302 to trailing edge 304. Rail 310 includes a raised bearing surface 316 with a leading portion 318, a waist portion 320 and a trailing portion 322. Bearing surface 316 is positioned substantially along a longitudinal center line 321 of slider 300, with leading portion 318 extending substantially to inside edge 306. A transducer, such as a magnetic head, is encapsulated on trailing edge 304, adjacent trailing portion 322 of bearing surface 316.

Rail 310 further includes a shallow recessed step surface 323. Recessed step surface 323 includes a leading step surface 324 and waist step surfaces 328 and 330. Bearing surface 316 has a leading face 326 which is adjacent to leading step surface 324. Leading face 326 forms an acute angle 332 with leading edge 302, which opens toward inside edge 306.

Rail 312 has a raised bearing surface 340 and a shallow recessed step surface 342. Bearing surface 340 terminates prior to trailing edge 304. Recessed step surface 342 includes leading step surface 344, waist step surface 346 and trailing step surface 348. Bearing surface 340 has a leading face 350 which is adjacent to leading step surface 344. Leading face 350 forms an acute angle 352 with leading edge 302. Leading face 350 is substantially parallel to leading face 326 and is open toward inside edge 306.

Slider 300 has similar advantages as the sliders shown in FIGS. 4 and 5. Leading step surfaces 324 and 344 result in adequate takeoff performance and pitch stiffness without requiring a leading edge taper. Angled leading faces 326 and 350 prevent debris collection and provide efficient pressurization at the inner diameter of the disc and inefficient pressurization at the outer diameter of the disc, which results in a flat fly height profile over the disc surface. Also, waist step surfaces 328 and 346 are relatively wide toward inner edge 306, which provides the step bearing effect at the inner disc diameter and provides a subambient pressure effect when slider 300 flies at the outer diameter of the disc. In addition, the large surface area of waist step surface 328 as compared to waist step surface 346 provides additional subambient pressure at the outer diameter of the disc to further limit any fly height increase at the outer diameter. However, slider 300 exhibits larger roll at the inner diameter and at the outer diameter than do the sliders shown in FIGS. 4 and 6.

Although the present invention has been described with reference to preferred embodiments, workers skilled in the art will recognize that changes may be made in form and detail without departing from the spirit and scope of the invention.

What is claimed is:

1. A disc head slider for communicating with a rotating disc, the slider comprising:

a slider body having leading, trailing, inside and outside slider edges relative to the disc; and an inside rail, an outside rail and a center rail positioned on the slider body, each rail including inside and outside rail edges, a bearing surface and an edge step surface extending along the inside rail edge, which is raised from the slider body and recessed from the bearing surface;

wherein the bearing surface of each rail narrows from a leading portion of the bearing surface to a waist portion of the bearing surface and widens from the waist portion of the bearing surface to a trailing portion of the bearing surface to thereby define a waist step area of the edge step surface of each rail; and wherein the waist step area of the center rail is greater than the waist step area of the inside rail and the waist step area of the outside rail.

2. The disc head slider of claim 1 wherein the center rail further comprises an edge step surface extending along the outside rail edge of the center rail, which has less surface area than the edge step surface extending along the inside rail edge of the center rail.

3. The disc head slider of claim 1 and further comprising:

a first bleed slot positioned between the outside rail and the center rail and extending from the leading slider edge to the trailing slider edge;

a second bleed slot positioned between the inside rail and the center rail and extending from the leading slider edge to the trailing slider edge; and wherein the first and second bleed slots are recessed from the bearing surfaces by approximately 10 to 50 microns.

4. The disc head slider of claim 1 wherein the edge step surfaces of the inside, outside and center rails are recessed from the bearing surfaces by approximately 0.1 to 2.0 microns.

5. The disc head slider of claim 1 wherein the bearing surfaces of the inside and outside rails terminate prior to the trailing slider edge.

6. The disc head slider of claim 1 wherein the bearing surfaces of the inside, outside and center rails each have inside and outside bearing edges relative to the inside and outside edges of the slider body, wherein the inside bearing edges are generally concave along the waist area and the outside bearing edges are generally straight along the waist area.

7. The disc head slider of claim 1 wherein the waist portion of each rail has a length and the length of the center rail waist portion is greater than the length of the inside and outside rail waist portions.

8. The disc head slider of claim 1 wherein the center rail bearing surface extends to the trailing slider edge and the disc head slider further comprises a transducer mounted to the center rail.

9. The disc head slider of claim 1 wherein each of the inside, outside and center rails further includes:
a leading step surface which is substantially parallel with the bearing surface;
a leading face which extends between the leading step surface and the bearing surface; and
wherein the leading faces of the rails are substantially parallel to one another and form an acute angle with the leading slider edge.

10. The disc head slider of claim 9 wherein the acute angle is open toward the inside slider edge.

11. A disc drive comprising:
a housing;
a disc mounted in the housing for rotation about a central axis, the disc having a recording surface;
a track accessing arm supported over the recording surface, and
a slider carried by the track accessing arm for communication with the recording surface, the slider comprising:
a slider body having leading, trailing, inside and outside slider edges relative to the disc and having a center line which extends from the leading slider edge to the trailing slider edge;
a center rail positioned substantially along the center line;
a side rail positioned between the outside slider edge and the center rail;
wherein each rail comprises inside and outside rail edges, a bearing surface and an edge step surface which is raised from the slider body and recessed from the bearing surface of each rail, wherein the edge step surface extends along the inside rail edge of the each rail;
wherein the bearing surface of each rail narrows from a leading portion of the bearing surface to a waist portion of the bearing surface and widens from the waist portion of the bearing surface to a trailing portion of the bearing surface to thereby define a waist step area of the edge step surface of each rail; and
wherein the waist step area of the center rail is greater than the waist step area of the side rail.

12. The disc drive of claim 11 wherein:
the center rail further comprises an edge step surface extending along the outside rail edge of the center rail, which has an area that is less than the area of the edge step surface extending along the inside rail edge of the center rail; and
the side rail further comprises an edge step surface extending along the outside rail edge of the side rail, which has an area that is less than the area of the edge step surface extending along the inside rail edge of the side rail.

13. A disc head slider for communicating with a rotating disc, the slider comprising:
a slider body having leading, trailing, inside and outside slider edges relative to the disc and having a center line which extends from the leading slider edge to the trailing slider edge;
a center rail positioned substantially along the center line;
a first side rail positioned generally along the outside slider edge;
wherein each rail includes inside and outside rail edges, a bearing surface and an edge step surface along the inside rail edge which is raised from the slider body and recessed from the bearing surface;
wherein the bearing surface of each rail narrows from a leading portion of the bearing surface to a waist portion of the bearing surface and widens from the waist portion of the bearing surface to a trailing portion of the bearing surface to thereby define a waist step area of the edge step surface of each rail; and
wherein the waist step area of the center rail is greater than the waist step area of the first side rail.

14. The disc head slider of claim 13 and further comprising a second side rail positioned between the center rail and the inside slider edge.

15. The disc head slider of claim 13 and further comprising:
a bleed slot positioned between the first side rail and the center rail and extending from the leading slider edge to the trailing slider edge.

16. The disc head slider of claim 13 wherein:
the edge step surface of the center rail extends from the bearing surface of the center rail, substantially to the inside slider edge; and
the leading portion of the center rail extends substantially to the inside slider edge.

17. The disc head slider of claim 16 wherein the waist portion of the center rail is centered substantially along the center line.

18. The disc head slider of claim 13 wherein the center rail further includes:
a leading step surface which is substantially parallel with the bearing surface;
a leading face adjacent the leading step surface; and
wherein the leading face forms an acute angle with the leading slider edge which opens toward the inside slider edge.

* * * * *